(12) United States Patent
Lazarev et al.

(10) Patent No.: US 6,876,806 B2
(45) Date of Patent: Apr. 5, 2005

(54) OPTICAL WAVEGUIDES AND METHOD OF FABRICATION THEREOF

(75) Inventors: Pavel I. Lazarev, Belmont, CA (US); Michael V. Paukshto, San Mateo, CA (US)

(73) Assignee: Optiva, Inc., South San Francisco, CA (US)

( * ) Notice: Subject to any disclaimer, the term of this patent is extended or adjusted under 35 U.S.C. 154(b) by 380 days.

(21) Appl. No.: 09/860,722

(22) Filed: May 18, 2001

(65) Prior Publication Data

US 2002/0090188 A1 Jul. 11, 2002

Related U.S. Application Data

(60) Provisional application No. 60/249,034, filed on Nov. 14, 2000.

(51) Int. Cl.[7] .................................................. G02B 6/02
(52) U.S. Cl. ....................................... 385/128; 385/147
(58) Field of Search ..................... 385/14–16, 128–132, 385/147

(56) References Cited

U.S. PATENT DOCUMENTS

| | | | |
|---|---|---|---|
| 2,400,877 A | 5/1946 | Dreyer | |
| 2,481,830 A | 9/1949 | Dreyer | |
| 2,524,286 A | 10/1950 | Dreyer | |
| 4,386,822 A | * 6/1983 | Bergh | 385/11 |
| 4,589,728 A | 5/1986 | Dyott et al. | |
| 4,721,352 A | * 1/1988 | Sorin et al. | 385/11 |
| 4,795,233 A | 1/1989 | Chang | |
| 5,361,320 A | 11/1994 | Liu et al. | |
| 5,533,151 A | 7/1996 | Leonard | |
| 5,659,378 A | 8/1997 | Gessel | |
| 5,739,296 A | 4/1998 | Gvon et al. | |
| 6,049,428 A | 4/2000 | Khan et al. | |

FOREIGN PATENT DOCUMENTS

EP     0 234 943 A1    6/1983

OTHER PUBLICATIONS

Buck, J., "Fundamentals of Optical Fibers," John Wiley & Sons, Inc., New York, no date & yr.
Bergh et al., "Single–mode Fiber–optic Polarizer," *Optics Letters*, vol. 5, No. 11, Nov. 1980, pp. 479–481.
Kaminow, I., "Polarization In Optical Fibers," *Journal of Quanturn Electronics*, vol. GE–17, No. 1, Jan. 1981, pp. 15–21, no date.
Tonning, A., "Circularly Symmetric Optical Waveguide With Strong Anisotropy," *Transactions On Microwave Theory and Techniques*, vol. MTT–30, No. 5, May 1982, pp. 790–794.
Ferrando et al., "Vector Description Of Higher–order Modes In Photonic Crystal Fibers," *J. Opt. Soc. Am. A*, vol. 17, No. 7, Jul. 2000, pp. 1333–1340.
Thyagarajan, K., "Thin–metal–clad Waveguide Polarizers: Analysis And Comparison With Experiment," *Optics Letters*, vol. 15, No. 18, Sep. 1990, pp. 1041–1043.
Dai, J., "Analysis Of Cladded Uniaxial Single–crystal Fibers," *J. Opt. Soc. Am. A*, vol. 8, No. 12, Dec. 1991, pp. 2021–2025.
Yeh et al., "Optics Of Liquid Crystal Displays," John Wiley & Sons, Inc., New York., pp. 87–90, no date.
Senior, J., "Optical Fiber Communications Principles And Practice," Prentice Hall, New York, no date & yr.
Kumazaki et al., et al., "Tunable Wavelength Filter With A Single–mode Grating Fiber Thinned By Plasma Etching," Optical Society of America, 2000, no date.

* cited by examiner

*Primary Examiner*—Akm Enayet Ulah
(74) *Attorney, Agent, or Firm*—Dorsey & Whitney LLP

(57) ABSTRACT

Optical waveguides of the type which include a light-transmitting core and a cladding layer on said core. The optical waveguide can be planar or cylindrical such as an optical fiber. The optical waveguide is provided with an additional coating of highly biaxial or uniaxial crystalline material with different refraction indices in different directions.

25 Claims, 5 Drawing Sheets

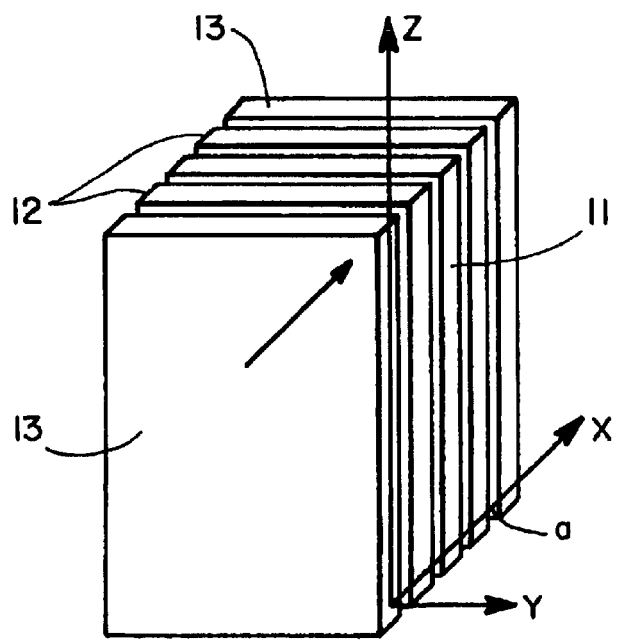
FIG_1
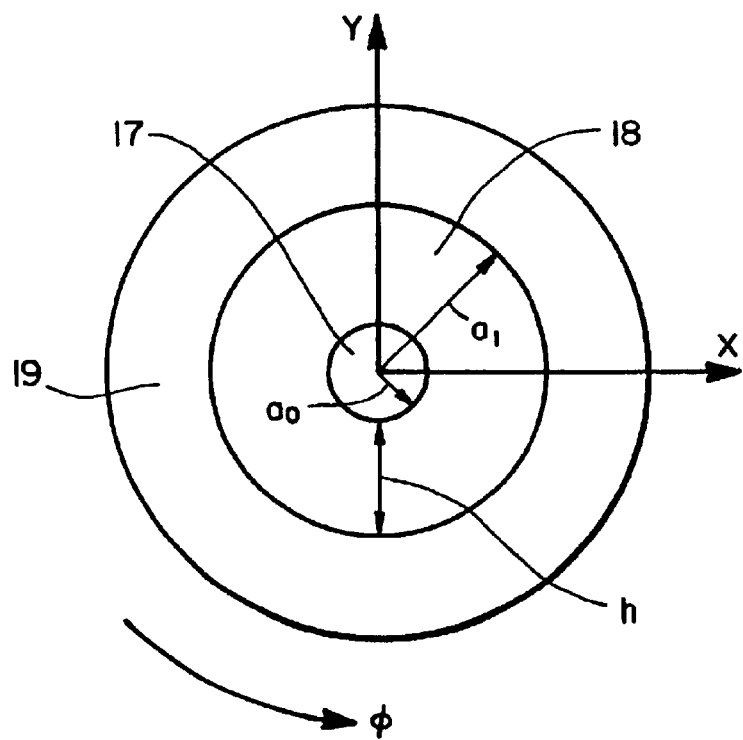
FIG_2

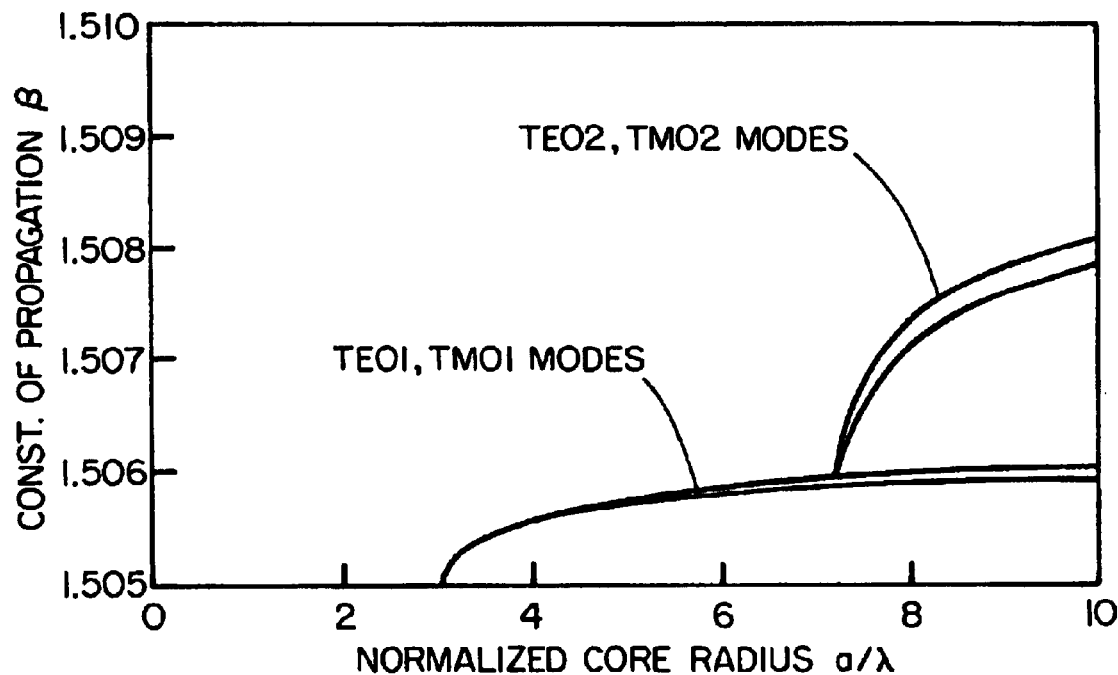
FIG_3
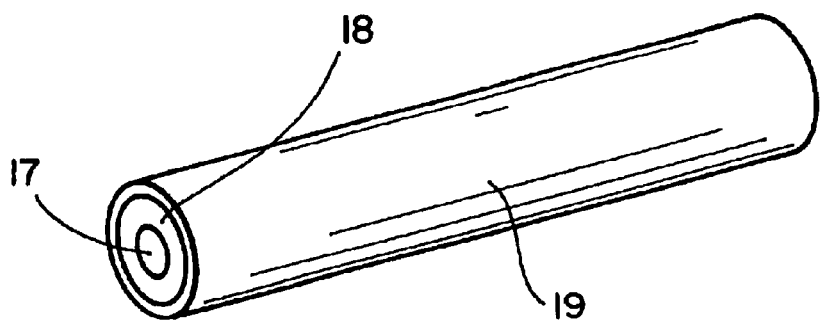
FIG_4

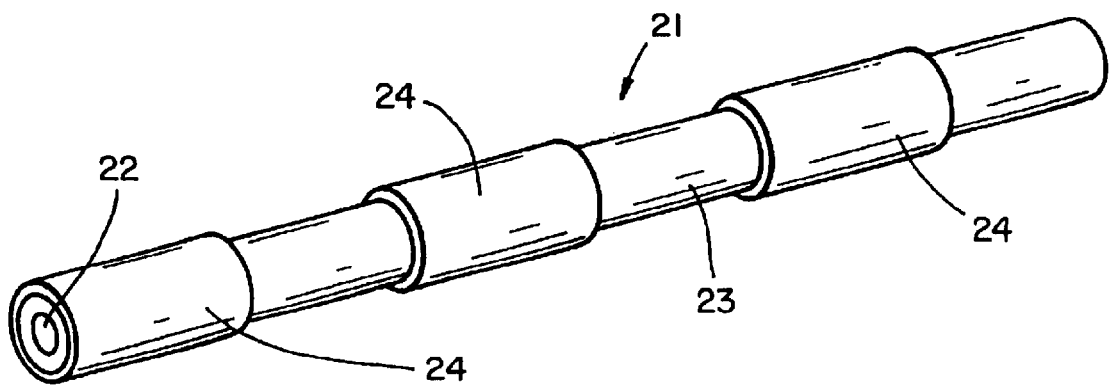
FIG_5
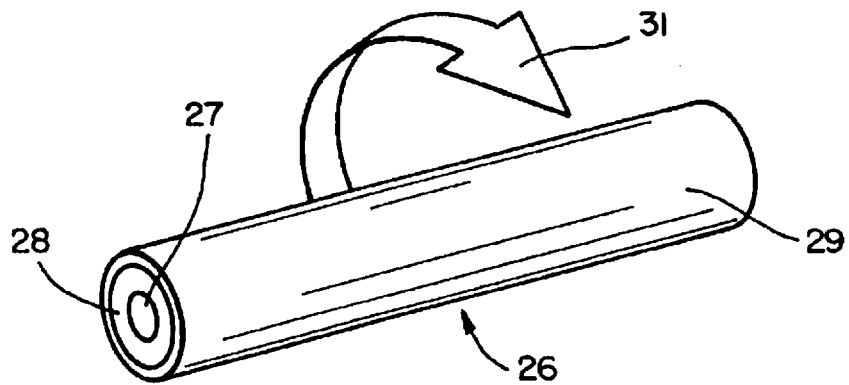
FIG_6
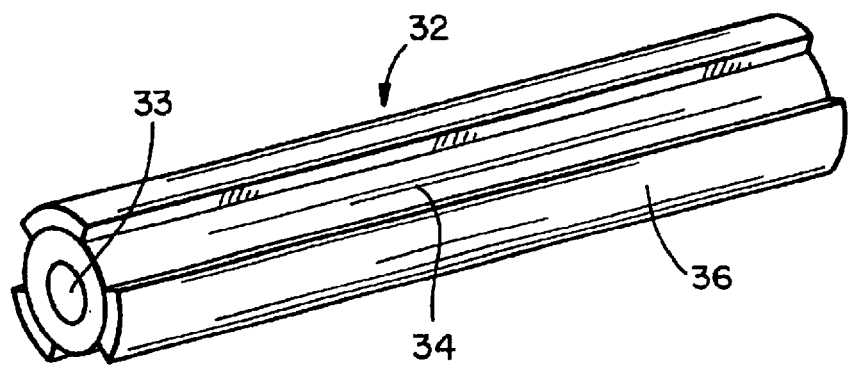
FIG_7

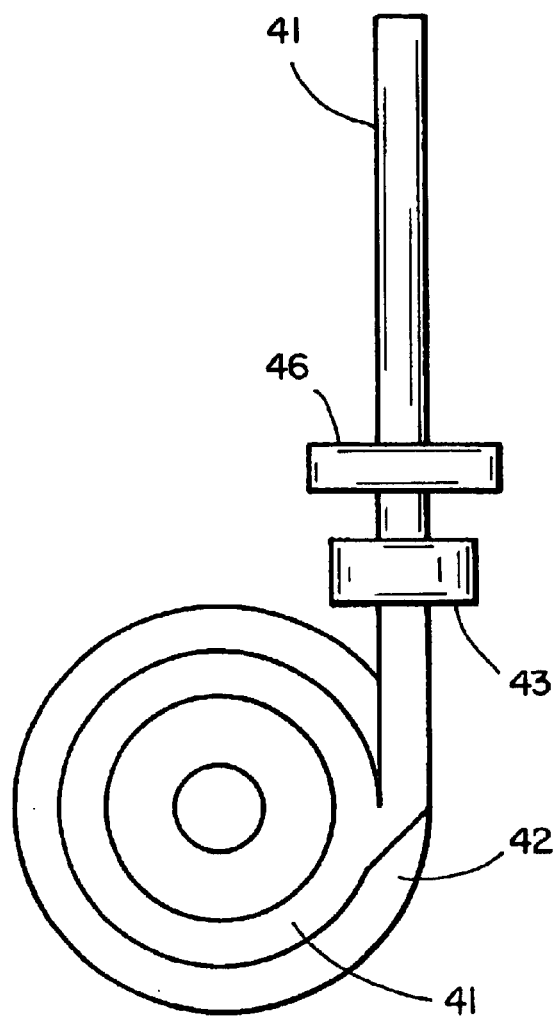
FIG_8
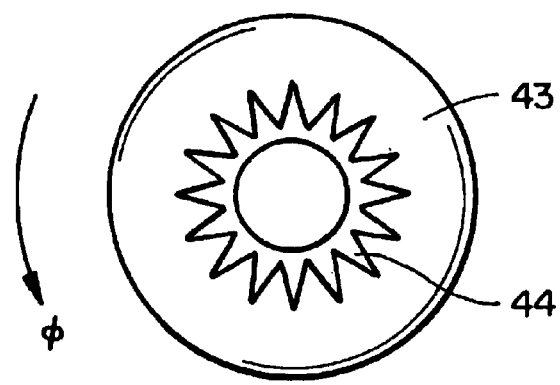
FIG_9

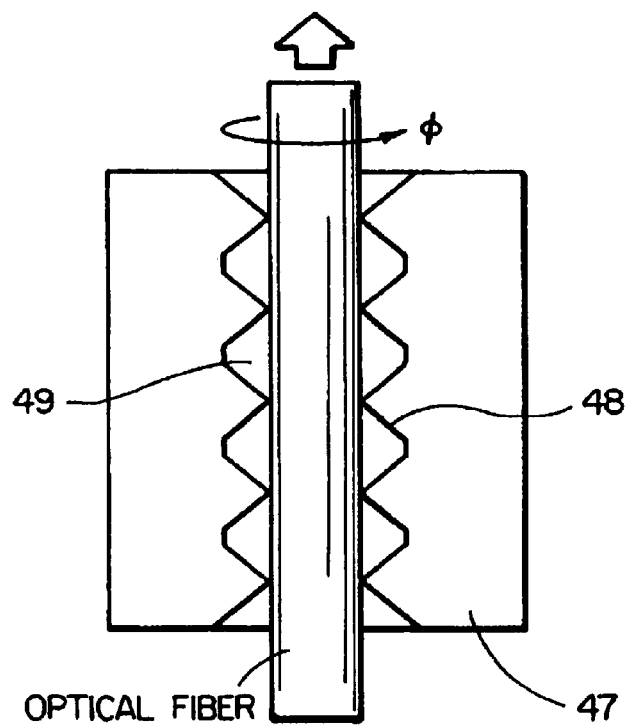
FIG_10
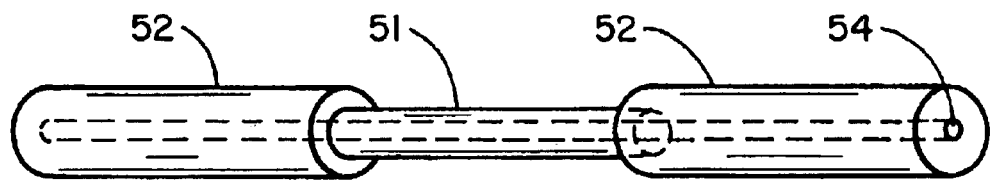
FIG_11
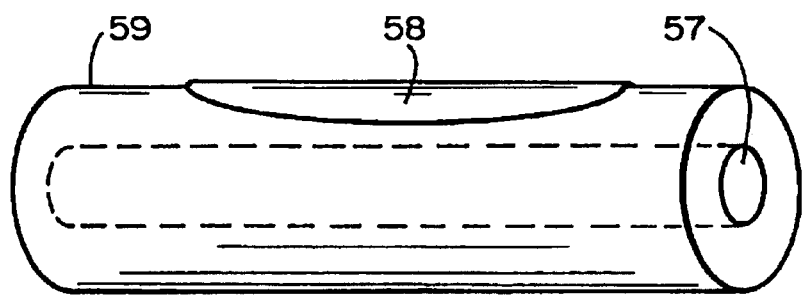
FIG_12

OPTICAL WAVEGUIDES AND METHOD OF FABRICATION THEREOF

RELATED APPLICATIONS

This application claims priority to U.S. Provisional Application Ser. No. 60/249,034 filed Nov. 14, 2000.

FIELD OF INVENTION

The present invention relates to components for use in optical systems such as optical waveguides for communication devices and to components that control light propagation through optical guides and provides selectivity in regard to spatial and directional distribution of electromagnetic field of light in the guide cross-section.

BACKGROUND OF INVENTION

Light has several basic properties such as brightness, wavelength (or color), and polarization. In optical devices we would like to control all of them and by modulation of these properties to signal something meaningful to a recipient on another end of a waveguide.

Polarization maintenance (or mode selectivity) is an important feature in light transmitting devices because of requirements imposed by coherent detection systems like homodynes and heterodynes (J. M. Senior, Optics Fiber Communications, N.Y., 1992, 908p).

In other terms, we can say that the combination of optical parameters in non-uniform planar waveguides or fibers imposes restrictions on the existence or energy-occupation level of certain modes, and creates useful properties of the guide or fiber. Industry has gone a long way at substantial expense in its efforts to create selective fibers with a certain configuration of birefringence in the fiber core. These fibers are named Polarization Maintaining Fibers (Ivan. P. Kaminow, "Polarization in Optical Fibers", *IEEE Journal of Quantum Electronics*, Vol. QE-17, No. 1, January 1981, 15–221). The fibers maintain certain transmission modes or combinations of modes that have specific spatial and field vector distribution of electromagnetic fields inside a guide or fiber. We will use in this application the terminology that is accepted in papers and patents describing mode structures of light transmission (J. D. Dai, C. K. Jen, Analysis of cladded uniaxial single-crystal fibers. J. Optical Soc. Am. A. 2022–2026; A. Tonning, Circularly symmetrical optical waveguide with strong anisotropy. IEEE Trans. Microwave Theory Technol. MTT-30, 790–794, 1982 John A. Buck, "Fundamentals of Optical Fibers", John Wiley & Sons, New York, p. 259) is the most appropriate from our perspective for a description of our invention. Another two publications that are highly relevant to this invention are Sorin, et al. U.S. Pat. No. 4,721,352, and R. A. Bergh, H. C. Lefevre, H. J. Shaw, "Single-mode fiber-optic polarizer", *Optics Letters*, 1880, vol. 5, No. 11, 479–481.

The definition of light-transmitting devices or waveguides in the present invention is very broad. It encompasses everything that transmits light between a polarized light source and a detector such as a heterodyne or a homodyne. A polarized light source is understood as a laser or un-polarized light source with a polarization controller. An un-polarized light source is any source of light, for example a light-emitting diode, a lamp, sun light, or day light.

In conventional optical systems, polarization is maintained by introducing birefringent elements in the system such as an asymmetrical core in Polarization Maintaining Fibers. However, it creates another problem, namely polarization dispersion of the signal. The present invention provides polarization maintenance in an optical system without the intrinsic problem of polarization dispersion. The present invention inhibits transmission of one of the modes (TE or TM) in optical guides, and provides components that transmit a polarized signal of one polarization while eliminating light of another polarization. These components might be used as polarization controllers, polarizersii and polarization-maintaining transmissive guides such as plane flat guides and fibers.

It is known from literature (R. A. Bergh, et. al. "Single-mode fiber optic polarizers", *Optics Letters*, vol. 5, No. 11, 1980, pp. 479–481) that crystalline material can create certain polarization specificity in waveguides such as fiber, for example. The similar specificity is provided by core and cladding asymmetry that is created by the design of the fiber itself as is shown by photonic crystals and "polarization maintaining fibers" (A. Ferrando et al., "Vector description of higher-order modes in photonic crystal fibers", *J. Opt. Soc. Am. A*/Vol. 17, No. 7, July 2000, 1333–1340). It is also known (P. Yeh and C. Gu, "Optics of Liquid Crystal Displays", N.Y., 1999, 427) that some crystals have polarizing capability and maintain polarization of the light.

SUMMARY OF THE INVENTION

The present invention employs material of the type disclosed in I. G. Khan et al. U.S. Pat. No. 5,739,296, and I. G. Khan et al. U.S. Pat. No. 6,049,428, that provides anisotropic crystalline coatings, or coatings such as described in U.S. Pat. Nos. 2,400,877, 2,481,830 and 2,524,286, with easy control over crystallographic axis direction.

An optical waveguide is provided in which polarization of light transmitted through the waveguide is maintained or polarized. The optical waveguide can be planar or cylindrical. The guide comprises a core, a cladding and a film or coating of highly biaxial or uniaxial crystalline material which has different refraction indices in different directions. The material is deposited in such a manner that the film has different optical properties along different axes. In one embodiment, the film material consists of a modified organic compound of flat molecules that possess a liquid-crystal phase structure formed in water and based upon hydrophobic-hydrophilic interaction. The lyotropic liquid crystal material may be coated on the cladding under shear force as a molecularly-oriented thin film. Material of this type is described in U.S. Pat. Nos. 5,739,926 and 6,049,428. Other polarizing films such as described in U.S. Pat. Nos. 2,400,877, 2,481,830 and 2,524,286 may also be employed in the present invention.

BRIEF DESCRIPTION OF THE DRAWINGS

The invention will understood from the following description when read in connection with the accompanying drawings, in which:

FIG. 1 is a perspective view of a section of a planar waveguide with a coating or film in accordance with the present invention.

FIG. 2 is a cross-sectional view of a cylindrical waveguide with a film in accordance with the present invention.

FIG. 3 is a diagram showing eigenvalues for a few modes in a step-index fiber with a coating film in accordance with the present invention.

FIG. 4 is a perspective view of a cylindrical waveguide in accordance with an embodiment of the invention.

FIG. 5 is a perspective view of an optical fiber with another coating film configuration.

FIG. 6 is a perspective view of an optical fiber with the molecules in the coating film spirally oriented.

FIG. 7 is a perspective view of an optical fiber with the film segmented around the circumference of the fiber.

FIG. 8 is a schematic diagram of a machine for applying a crystalline film to a fiber.

FIG. 9 is a cross-sectional view of the coating unit of FIG. 8.

FIG. 10 is a schematic view of another suitable film coating unit.

FIG. 11 is a perspective view of an optical fiber with a cladding thinned by reactive plasma etching.

FIG. 12 is a perspective view of an optical fiber that has been processed to thin the cladding from one side of the fiber.

DESCRIPTION OF THE INVENTION

The present invention is directed to new polarization-maintaining and polarizing optical waveguides that are, for example, flat planar guides or cylindrical guides or fibers. Also described is a method of manufacturing mode-selective optical guides such as planar multilayer waveguides or cylindrical guides or fibers. The design of the waveguides has a major distinction: one of the layers is made from a highly anisotropic crystalline material coating with refraction indices that are different in different directions. By the deposition technique employed we can control the direction of the crystallographic axis of the crystals in the final film. Optical properties of crystalline film are different along a crystallographic axis and that is the major benefit that allows for influencing properties of optical waveguides by selecting material and direction or pattern of deposition.

Planar guides, FIG. 1, are layers of materials that transmit light. The transmitting layer 11 is sandwiched between cladding layers 12. One or several anisotropic layers 13 interact with light in such a way that one polarization mode is transmitted along layer 11 and another one is absorbed or separated and guided out of the waveguide by the layer 13. As an example, we consider the case of uniaxial anisotropic layers.

A light wave electric field vector is $$E \exp[i(\omega t - k \cdot r)]$$

and a magnetic field vector is $$H \exp[i(\omega t - k \cdot r)],$$

where
$E=(E_1, E_2, E_3)$ and $H=(H_1, H_2, H_3)$ are some constant vectors; $r=(x, y, z)$; $k=(k, 0, \beta)$–wavevectors.

Let us consider the interaction between two anisotropic layers 13 and the cladding layers 12 having the interface boundary x=a, such that the layer of uniaxial media is located at x>a and the cladding layers 12 are located at x<a. Their common surface is at x=a. The wave propagation direction is z.

We consider first that the extraordinary direction of uniaxial media is the z-axes. The principal coordinate system of the dielectric tensor $\in$ coincides with the courtesan one (x, y, z). For uniaxially anisotropic media, $\in_x = \in_y = \in_0 n_o^2$, $\in_z = \in_0 n_e^2$ where $n_o$ is the ordinary index of refraction, and $n_e$ is the extraordinary index or refraction of the layers 13.

Maxwell's equations are satisfied if $$((\omega/c)^2 n_o^2 - \beta^2)E_1 + k\beta E_3 = 0,$$

$$((\omega/c)^2 n_o^2 - k^2 - \beta^2)E_2 = 0,$$

$$k\beta E_1 + ((\omega/c)^2 n_e^2 - k^2)E_3 = 0.$$

There are two solutions for this system.
The first solution is:

$$E=(0, 1, 0); k^2=((\omega/c)^2 n_o^2 - \beta^2).$$

The second solution is:

$$E=\alpha(\beta, 0, -(1/k)((\omega/c)^2 n_o^2 - \beta^2)); \alpha^2 = 1/((n_o/n_e)^4 k^2 + \beta^2), \alpha>0;$$
$$k^2=(n_e/n_o)^2((\omega/c)^2 n_o^2 - \beta^2).$$

It is clear that these two solutions are the orthogonal vectors. Thus the general form of the solution in the arbitrary layer x>a is:

$$E_x = \alpha\beta(C_1 \operatorname{Exp}[-ix(n_e/n_o)k - iz\beta + i\omega t] + C_2 \operatorname{Exp}[ix(n_e/n_o)k - iz\beta + i\omega t]);$$

$$E_y = D_1 \operatorname{Exp}[-ixk - iz\beta + i\omega t] + D_2 \operatorname{Exp}[ixk - iz\beta + i\omega t];$$

$$E_z = -\alpha(n_o/n_e)k(C_1 \operatorname{Exp}[-ix(n_e/n_o)k - iz\beta + i\omega t] - C_2 \operatorname{Exp}[ix(n_e/n_o)k - iz\beta + i\omega t]).$$

Here $C_1$, $C_2$, $D_1$, $D_2$ are arbitrary constant and $$\alpha = \frac{1}{\sqrt{\frac{n_0^2}{n_e^2}\left(\frac{\omega^2}{c^2}n_0^2 - \beta^2\right) + \beta^2}}, k = \sqrt{\frac{\omega^2}{c^2}n_0^2 - \beta^2}.$$

Now the magnetic field vector components are:

$$H_x = -(1/\omega\mu)\beta(D_1 \operatorname{Exp}[-ixk - iz\beta + i\omega t] + D_2 \operatorname{Exp}[ixk - iz\beta + i\omega t]);$$

$$H_y = (1/\omega\mu)(\omega^2 n_o^2/c^2)\alpha(C_1 \operatorname{Exp}[-ix(n_e/n_o)k - iz\beta + i\omega t] + C_2 \operatorname{Exp}[ix(n_e/n_o)k - iz\beta + i\omega t]);$$

$$H_z = (1/\omega\mu)k(D_1 \operatorname{Exp}[-ixk - iz\beta + i\omega t] - D_2 \operatorname{Exp}[ixk - iz\beta + i\omega t]).$$

In the case of isotropic media (layer 12) the solution for the arbitrary layer is given by:

$$E_x = \alpha\beta(N_1 \operatorname{Exp}[-ixk - iz\beta + i\omega t] + N_2 \operatorname{Exp}[ixk - iz\beta + i\omega t]);$$

$$E_y = M_1 \operatorname{Exp}[-ixk - iz\beta + i\omega t] + M_2 \operatorname{Exp}[ixk - iz\beta + i\omega t];$$

$$E_z = -\alpha k(N_1 \operatorname{Exp}[-ixk - iz\beta + i\omega t] - N_2 \operatorname{Exp}[ixk - iz\beta + i\omega t]);$$

$$H_x = -(1/\omega\mu)\beta(M_1 \operatorname{Exp}[-ixk - iz\beta + i\omega t] + M_2 \operatorname{Exp}[ixk - iz\beta + i\omega t]);$$

$$H_y = (1/\omega\mu)(\omega n/c)(N_1 \operatorname{Exp}[-ixk - iz\beta + i\omega t] + N_2 \operatorname{Exp}[ixk - iz\beta + i\omega t]);$$

$$H_z = (1/\omega\mu)k(M_1 \operatorname{Exp}[-ixk - iz\beta + i\omega t] - M_2 \operatorname{Exp}[ixk - iz\beta + i\omega t]),$$

where $$\alpha = \frac{c}{\omega n}, k = \sqrt{\frac{\omega^2}{c^2}n^2 - \beta^2}.$$

and n is the index of refraction for isotropic cladding media (layer 12).

The condition of continuity at the interface x=a between cladding media and uniaxial media leads to $$E_y = M_1 \operatorname{Exp}[-iak_1] + M_2 \operatorname{Exp}[iak_1] = D_1 \operatorname{Exp}[-iak_2] + D_2 \operatorname{Exp}[iak_2];$$

$$E_z = -\alpha_1 k_1(N_1 \operatorname{Exp}[-iak_1] - N_2 \operatorname{Exp}[iak_1]) = -\alpha_2(n_o/n_e)k_2(C_1 \operatorname{Exp}[-ia(n_e/n_o)k_2] - C_2 \operatorname{Exp}[ia(n_e/n_o)k_2]);$$

$H_y=(1/\omega\mu)(\omega n/c)(N_1 \text{Exp}[-iak_1]+N_2 \text{Exp}[iak_1])=(1/\omega\mu)(\omega^2 n_o^2/c^2)\alpha_2(C_1 \text{Exp}[-ia(n_e/n_o)k_2]+C_2 \text{Exp}[ia(n_e/n_o)k_2]);$ $H_z=(1/\omega\mu)k_1(M_1 \text{Exp}[-iak_1]-M_2 \text{Exp}[iak_1])=(1/\omega\mu)k_2(D_1 \text{Exp}[-iak_2]-D_2 \text{Exp}[iak_2]).$ Here, $k_2$ and $\alpha_2$ are the constants k and $\alpha$ for uniaxial media; $k_1$ and $\alpha_1$ are the constants k and $\alpha$ for isotropic media.

Note, that so-called TE mode corresponds to $\{M_1, M_2, N_1=0, N_2=0\}$ and TM mode corresponds to $\{M_1=0, M_2=0, N_1, N_2\}$. We see that TE mode of isotropic media is coupled with TE mode of uniaxial media only and TM mode of isotropic media is coupled with TM mode of uniaxial media only. These two modes do not interact with each other for the ideal interface.

Thus for TE mode we have:

$E_y=M_1 \text{Exp}[-iak_1]+M_2 \text{Exp}[iak_1]=D_1 \text{Exp}[-iak_2]+D_2 \text{Exp}[iak_2];$ $H_z=k_1(M_1 \text{Exp}[-iak_1]-M_2 \text{Exp}[iak_1])=k_2(D_1 \text{Exp}[-iak_2]-D_2 \text{Exp}[iak_2]).$ For TM mode we have:

$E_z=-\alpha_1 k_1(N_1 \text{Exp}[-iak_1]-N_2 \text{Exp}[iak_1])=-\alpha_2(n_o/n_e)k_2(C_1 \text{Exp}[-ia(n_e/n_o)k_2]-C_2 \text{Exp}[ia(n_e/n_o)k_2]);$ $H_y=(\omega n/c)(N_1 \text{Exp}[-iak_1]+N_2 \text{Exp}[iak_1])=(\omega^2 n_o^2/c^2)\alpha_2(C_1 \text{Exp}[-ia(n_e/n_o)k_2]+C_2 \text{Exp}[ia(n_e/n_o)k_2]).$ It is seen that TE mode depends only of the ordinary refractive index although TM mode depends on extraordinary and ordinary ones.

Conclusion 1. If we assume that coated direction of uniaxial material is the z axes and that the uniaxial material has the high absorption coefficient for ordinary directions x and y, then TE mode will be an extinguished wave and any wave accidentally appearing in the isotropic media TE mode will decay because of the interaction with the uniaxial material. The extinction rate of TM mode depends of $\beta$ and ratio $n_e/n_o$.

Now we consider another design where the extraordinary direction of uniaxial media is the y-axes. The principal coordinate system of the dielectric tensor $\in$ coincides with the courtesan one (x, y, z). For uniaxially anisotropic media, $\in_x=\in_z=\in_0 n_o^2$, $\in_y=\in_0 n_e^2$, the Maxwell's equations are satisfied if $((\omega/c)^2 n_o^2-\beta^2)E_1+k\beta E_3=0,$ $((\omega/c)^2 n_e^2-k^2-\beta^2)E_2=0,$ $k\beta E_1+((\omega/c)^2 n_o^2-k^2)E_3=0.$ There are two solutions for this system.
The first solution is:

$E=(0, 1, 0); k_e^2=((\omega/c)^2 n_e^2-\beta^2).$

The second solution is:

$E=\alpha(\beta, 0, -k_o); \alpha=c/\omega n_o; k_o^2=((\omega/c)^2 n_o^2-\beta^2).$ It is clear that these two solutions are the orthogonal vectors. Thus the general form of the solution in the arbitrary layer x>a is:

$E_x=\alpha\beta(C_1 \text{Exp}[-ixk_o-iz\beta+i\omega t]+C_2 \text{Exp}[ixk_o-iz\beta+i\omega t]);$ $E_y=D_1 \text{Exp}[-ixk_e-iz\beta+i\omega t]+D_2 \text{Exp}[ixk_e-iz\beta+i\omega t];$ $E_z=-\alpha k_o(C_1 \text{Exp}[-ixk_o-iz\beta+i\omega t]-C_2 \text{Exp}[ixk_o-iz\beta+i\omega t]).$ Here $C_1$, $C_2$, $D_1$, $D_2$ are arbitrary constant and $$k_0=\sqrt{\frac{\omega^2}{c^2}n_0^2-\beta^2},\ k_e=\sqrt{\frac{\omega^2}{c^2}n_e^2-\beta^2}$$

Now the magnetic field vector components are:

$H_x=-(1/\omega\mu)\beta(D_1 \text{Exp}[-ixk_e-iz\beta+i\omega t]+D_2 \text{Exp}[ixk_e-iz\beta+i\omega t]);$ $H_y=(1/\omega\mu)(\omega n_o/c)(C_1 \text{Exp}[-ixk_o-iz\beta+i\omega t]+C_2 \text{Exp}[ixk_o-iz\beta+i\omega t]);$ $H_z=(1/\omega\mu)k_e(D_1 \text{Exp}[-ixk_e-iz\beta+i\omega t]-D_2 \text{Exp}[ixk_e-iz\beta+i\omega t]).$ The condition of continuity at the interface x=a between isotropic media and uniaxial media leads to $E_y=M_1 \text{Exp}[-iak]+M_2 \text{Exp}[iak]D_1 \text{Exp}[-iak_e]+D_2 \text{Exp}[iak_e];$ $E_z=-\alpha k(N_1 \text{Exp}[-iak]-N_2 \text{Exp}[iak])=-\alpha_2 k_o(C_1 \text{Exp}[-iak_o]-C_2 \text{Exp}[iak_o]);$ $H_y=(1/\omega\mu)(\omega n/c)(N_1 \text{Exp}[-iak]+N_2 \text{Exp}[iak])=(1/\omega\mu)(\omega n_o/c)(C_1 \text{Exp}[-iak_o]+C_2 \text{Exp}[iak_o]);$ $H_z=(1/\omega\mu)k(M_1 \text{Exp}[-iak]-M_2 \text{Exp}[iak])=(1/\omega\mu)k_e(D_1 \text{Exp}[-iak_e]-D_2 \text{Exp}[iak_e]).$ Here, $\alpha_2$ is the constant $\alpha$ for uniaxial media; $\alpha_1$ is the constant $\alpha$ for isotropic media.

We see that TE mode of isotropic media is coupled with TE mode of uniaxial media only and TM mode of isotropic media is coupled with TM mode of uniaxial media only. These two modes do not interact with each other for the ideal interface.

Thus for TE mode we have:

$E_y=M_1 \text{Exp}[-iak]+M_2 \text{Exp}[iak]=D_1 \text{Exp}[-iak_e]+D_2 \text{Exp}[iak_e];$ $H_z=k(M_1 \text{Exp}[-iak]-M_2 \text{Exp}[iak])=k_e(D_1 \text{Exp}[-iak_e]-D_2 \text{Exp}[iak_e]).$ For TM mode we have:

$E_z=-\alpha_1 k(N_1 \text{Exp}[-iak]-N_2 \text{Exp}[iak])=-\alpha_2 k_o(C_1 \text{Exp}[-iak_o]-C_2 \text{Exp}[iak_o]);$ $H_y=(\omega n/c)(N_1 \text{Exp}[-iak_1]+N_2 \text{Exp}[iak_1])=(\omega n_o/c)(C_1 \text{Exp}[-iak_o]+C_2 \text{Exp}[iak_o]).$ It is seen that TE mode depends only on the extraordinary refractive index although TM mode depends only on ordinary one.

Conclusion 2. If we assume that coated direction of uniaxial material is the y-axes and that the uniaxial material has the high absorption coefficient for ordinary directions x and z, then TE mode will travel through isotropic media (core) without decay although TM mode will be an extinguished mode. Any accidentally appeared in isotropic media TM mode will decay because of the interaction with the uniaxial material.

Thus, as seen from conclusions 1 and 2, by proper orientation of the uniaxial media, the polarization TM or TE mode can be transmitted while the other mode is extinguished.

In the planar guide according to FIG. 1, the coated layer consists of uniaxial material and interacts with the cladding. The rate of the interaction and therefore the losses depend of the cladding thickness.

Let us consider the waveguide with a cylindrical cross-section such as shown in FIG. 2. For cylindrical symmetry, the simulation of this design is more complicated, however, the final result is close to that of the planar design. The waveguide includes a core 17, cladding 18 and uniaxial or biaxial anisotropic film 19.

According to FIG. 2 the thickness of the cladding is h=$a_1-a_0$. The main parameters are the core radius, $-a_0$, thickness, h, refractive index of the core layer, $-n_c$, refractive index of the cladding layer, $-n_{c1}$, refractive of the coating layer, no=$no_1-i*no_2$ and ne=$ne_1-i*ne_2$. Now we consider the case: $n_c>n_{c1}$, $n_c>no_1$ (that is the necessary condition of light propagation) and extraordinary direction of the coating layer is along the fiber.

The goal is to find the eventual propagating modes, cutoff condition and their dependence upon input parameters. We assume that $$\{E_r(r), E_{74}(r), E_z(r), H_r(r), H_\theta(r), H_z(r)\}e^{i\omega t}e^{i(n\theta-\beta z)}.$$

The equation for eigenvalues β has the form $$det(M)[\beta]=0, \quad (1)$$

where det(M) is the determinant of the matrix M corresponding to this case. This matrix is presented in the form of the Table 1 below. It was determined that the determinant det(M) in dimensionless variables does not depend of c, μ, $\in_0$. Keeping the notation $a_k$ for $a_k*(\omega/c)$, k=0, 1; and β for βc/ω; $pa0^2=n_c^2-\beta^2$, $pa1^2=no^2-\beta^2$, $pa2^2=n_{c1}^2-\beta^2$, $$p_1 = \sqrt{\beta^2 - n_0^2}; \quad q_1 = \sqrt{\frac{n_e^2}{n_0^2}\beta^2 - n_e^2}$$

$$p_0 = q_0 = \sqrt{n_c^2 - \beta^2} \quad p_2 = q_2 = \sqrt{\beta^2 - n_{cl}^2}$$

The functions I, J, K, and Y in the Table 1 are the Bessel functions.

TABLE 1

| | | | | | | | |
|---|---|---|---|---|---|---|---|
| J[a0p0]pa0² | 0 | -J[a0p1]pa1² | -Y[a0p1]pa1² | 0 | 0 | 0 | 0 |
| 0 | J[a0q0]pa0² | 0 | 0 | -J[a0q1]pa1² | -Y[a0q1]pa1² | 0 | 0 |
| βnJ[a0p0]/a0 | $-n_c^2$q0 J'[a0q0] | -βnJ[a0p1]/a0 | -βnY[a0p1]/a0 | $n_o^2$q1 J'[a0q1] | $n_o^2$q1 Y'[a0q1] | 0 | 0 |
| -p0J'[a0p0] | βnJ[a0q0]/a0 | p1J'[a0p1] | p1Y'[a0p1] | -βnJ[a0q1]/a0 | -βnY[a0q1]/a0 | 0 | 0 |
| 0 | 0 | βnJ[a1p1]/a1 | βnY[a1p1]/a1 | $-n_o^2$q1 J'[a1q1] | $-n_o^2$q1 Y'[a1q1] | -βnK[a1p2]/a1 | $n_{c1}^2$q2 K'[a1q2] |
| 0 | 0 | -p1J'[a1p1] | -p1Y'[a1p1] | βnJ[a1q1]/a1 | βnY[a1q1]/a1 | p2K'[a1p2] | -βnK[a1q2]/a1 |
| 0 | 0 | J[a1p1]pa1² | Y[a1p1]pa1² | 0 | 0 | -K[a1p2]pa2² | 0 |
| 0 | 0 | 0 | 0 | J[a1q1]pa1² | Y[a1q1]pa1² | 0 | -K[a1q2]pa2² |

Each solution β of the equation (1) corresponds to a propagating mode. There are only a finite number of eigenvalues $\beta_{n,k}$ for each integer n. If β is a real number then such a mode is propagating without an absorption loss. In our case the coating layer has complex refractive therefore each solution β of the equation (1) is the complex number.

If the imaginary part of wave number β is small enough (such that the absorption loss is small enough) then such a mode would be a propagating one.

The magnitude of the imaginary part of the wave number Im[β] depends basically on the cladding layer thickness h and absorption coefficients $no_2$ and $ne_2$. Different modes have the different absorption rates which are the basis for mode selectivity (polarization selectivity). Moreover, the high rate of birefringence $\Delta n=no_1-ne_1$ (about 0.6–0.9) and the high refractive index $no_1$ (about 2.5) ensure high mode selectivity.

If an eigenvalue $\beta_{n,k}$ is defined from the equation (1) then the electric and magnetic field distributions can be found from Maxwell equations. The fraction of modal power in the core, $\eta_{n,k}$, can be derived from these field distributions $$\eta_{n,k} = \frac{\int_0^a (E_r H_\theta - E_\theta H_r)r\,dr}{\int_0^a (E_r H_\theta - E_\theta H_r)r\,dr + \int_a^\infty (E_r H_\theta - E_\theta H_r)r\,dr}$$

where $E_r$, $E_\theta$, $H_r$, $H_\theta$ are the field distributions correspond to the eigenvalue $\beta_{n,k}$.

The fraction of modal power $\eta_{n,k}$ substantially depends on refractive indices no=$no_1-i*no_2$ and ne=$ne_1-i*ne_2$ such that the different modes have the different modal powers and the different distributions in the waveguide cross section. Numerical example of the cutoff condition for a few lowest modes of step-index fiber with additional uniaxial coating layer is presented in FIG. 3. FIG. 3 shows eigenvalues of a few lowest modes of step-index fiber with coating layer. Core refractive index $n_c$=1.51; cladding refractive index $n_{c1}$=1.505; ordinary refractive index of coating layer no=1.5-i*0.01; extraordinary refractive index ne=2.5-i*0.5; cladding radius, 15 microns, wavelength—1.31. Partially coated TCF can change the fraction of modal power for specific modes.

Thus, the waveguides, planar or cylindrical (fiber), include an isotropic center layer or core and a cladding as in conventional light guides. However, in accordance with the present invention, a polarizing film or coating is applied to the cladding. The film or coating comprises parallel molecules or crystals which are aligned such that they present different indices of refraction to the two orthogonal polarizations of the light being transmitted along the core. The coating acts to pass or absorb light of one polarization and reflect light of the other polarization whereby the light transmitted along the waveguide has a single polarization. That is, its polarization is maintained.

FIG. 4 shows a fiber waveguide core 16 with cladding 17 which is provided with a uniform polarizing film or coating 19 uniformly applied along its entire length so that the polarization of the transmitted light is continuously maintained.

FIG. 5 shows a waveguide 21 including a core 22 and cladding 23. The polarizing film 24 is applied at intervals selected to maintain the polarization while using less polarizing material.

FIG. 6 shows a waveguide 26 with core 27 and cladding 28 in which the film 29 is applied with the axis of the molecules lying along spirals as indicated by arrow 31.

FIG. 7 shows a waveguide 32 with core 33 and cladding 34. The polarizing film is applied along the length of the fiber along parallel spaced segments 36.

In all of the embodiments, the polarizing film is applied on the cladding with the ordinary and extraordinary indices or refraction located so as to reflect the polarized light of one orientation back into the core and pass or absorb light of the other orientation to thereby maintain the state of polarization of the transmitted light. It is apparent that other film configurations can be used. The important characteristic of the film is that it maintains its orientation of the crystals or molecules in the film, whereby they maintain the direction of the indices of refraction.

Actually, the thin crystal overlay coating induces an exponentially decreasing boundary layer of TM or TE mode. Due to the difference in absorption coefficients, one of the modes will be an extinguished mode. If a birefringent crystal is used as the ordinary and extraordinary refractive indices of the crystal, then by properly orienting the crystal, one of the polarizations would 'see' an overlay with an index lower that the effective index and, hence, would be guided. The other polarization would 'see' an overlay index greater than the effective index and, hence, would leak away.

The film is applied to the surface of the cladding by applying a thin layer of a liquid solution including molecules. As the layer is applied, the molecules are suitably aligned. The molecules can be mechanically aligned by applying a frictional force along the direction of the desired alignment. Alternatively, the molecules can be aligned by applying an electric or magnetic field. After the molecules are aligned, the film is allowed to dry to form a solid film which maintains the molecules or crystals in alignment to provide the polarizing film. The material may be a film of non-crystalline oriented molecules such as described in U.S. Pat. Nos. 2,400,877 and 2,481,830, or may be anisotropic crystalline coatings of the type described in U.S. Pat. Nos. 5,739,296 and 6,049,428.

The coating is formed by applying a liquid solution including the organic compounds which form the molecules or crystals. The molecules or crystals are oriented into the cladding as a thin film while in a liquid state, and then the solution is allowed to dry by evaporation of the liquid leaving a solid film with oriented molecules or crystals which provide different indices of refractions in two directions to form the polarizing film.

FIG. 8 schematically illustrates a coating machine. The optical fiber 41 to be coated with the polarizing molecules is drawn through a bath 42 of the liquid crystal material. The fiber and liquid crystal material are drawn through a coating unit 43 with microgrooves 44 such as the unit shown in FIG. 9. Excess material is removed by the coating unit. At the same time, the coating unit applies shear forces to the molecules, thereby aligning them. The fiber with oriented molecules then travels through a drying unit 46. A fiber 41 coated with a solid film having oriented molecules is formed.

FIG. 10 schematically illustrates a coating unit 47 which includes circumferential microgrooves 48. The liquid crystal material is supplied into the space 49 between the fiber and the coating unit. The coating unit rotates while the fiber is drawn through the unit. This provides a spiral orientation of the particles.

FIG. 11 shows a waveguide with core 54, cladding 52 and thinned cladding 51 prepared for the coating by polarizing film.

FIG. 12 shows a waveguide with core 57, cladding 59 and thinned cladding 58 prepared for the coating by polarizing film.

Prior to coating, the optical fiber can be processed to thin the cladding such as it is shown at FIG. 11 (see, for example, H. Kamazaki et al., "Tunable wavelength filter with a single-mode grating fiber thinned by plasma etching," *Technical Digest*, OFC2001, Anaheim, Calif. MC5), and FIG. 12 (see, for example, U.S. Pat. No. 4,795,233 where a portion of cladding had been removed). This processing is important for standard optical fiber to increase the interaction of light with overcoating layer.

Polarizing films may be applied to planar waveguides in the manner described in U.S. Pat. Nos. 2,481,830 and 5,739,296.

Thus, there has been described an optical waveguide in which polarization of light transmitted through the waveguide is maintained or polarized. The optical waveguide can be planar or cylindrical. The guide comprises a core, a cladding and a film or coating of material which has different refraction indices in different directions. The material is deposited in such a manner that the film has different optical properties along the different crystallographic or molecular axes. The film material consists of a modified organic compound of molecules that possess a liquid-crystal phase structure. The liquid crystal material is coated on the cladding under shear force and dries as a molecularly oriented thin film. The film acts upon the optical waves which travel through the waveguide to maintain the plane of polarization of the waves.

What is claimed is:

1. An optical waveguide comprising:
   a light-transmitting core,
   a cladding layer on said core, and
   a coating on and supported solely by the cladding, said coating
   comprising a solid film of permanently aligned molecules or crystals with at least one optical axis of said molecules or crystals forming an angle between zero and ninety degrees with respect to the axis of said core.

2. An optical waveguide as in claim 1 wherein said core, cladding and coating are planar.

3. An optical waveguide as in claim 1 wherein said core, cladding and coating are cylindrical.

4. An optical waveguide as in claim 1 wherein a portion of the cladding has been removed.

5. An optical waveguide as in claim 1 or 4 in which said core is an optical fiber.

6. An optical waveguide as in claim 3 wherein said waveguide is a single-mode waveguide.

7. An optical waveguide as in claim 3 wherein said waveguide is a multi-mode waveguide.

8. An optical waveguide as in claims 1, 2 or 3 wherein said coating has anisotropic absorption coefficients.

9. An optical waveguide as in claims 1, 2 or 3 wherein said core and cladding have constant cross-section along the waveguide.

10. An optical waveguide as in claim 1 in which the optical axis of the molecules or crystals is parallel to the core axis.

11. An optical waveguide as in claim 1 in which the coating is applied to the entire surface of the cladding along the waveguide.

12. An optical waveguide as in claim 3 in which the coating is applied at spaced intervals along the waveguide.

13. An optical waveguide as in claim 3 in which the coating is applied at spaced intervals around the waveguide.

14. An optical waveguide as in claim 3 wherein the axis of the molecules or crystals is oriented spirally along the waveguide.

15. An optical waveguide as in claims 1, 2 or 3 in which the coating comprises a lyotropic material.

16. An optical waveguide as in claims 1, 2 or 3 wherein the core has a refractive index greater than the refractive indices of the coating in the direction perpendicular to the waveguide direction.

17. An optical waveguide as in claims 1, 2 or 3 wherein the coating has a birefringence greater than 0.001.

18. The method of manufacturing an optical waveguide which maintains the polarization of light passing therethrough comprising the steps of:

selecting an optical waveguide of the type having a core and a cladding layer, coating the cladding layer with a solid film of biaxial or uniaxial material with at least one optical axis of any given orientation on at least a part of the cladding by coating the cladding with a layer of liquid solution containing molecules or crystals of isotropic or anisotropic material, orienting the optical axis of said molecules or crystals, and then processing the layer to form the solid film and to permanently maintain the orientation of the optical axis of said molecules or crystals in said coating.

19. The method of manufacturing of a waveguide as in claim 18 wherein said orientation of the molecules or crystals is by the application of shear force as the coating is applied.

20. The method of manufacturing of an optical waveguide as in claim 18 wherein the orientation of the molecules or crystals is by application of a magnetic field as the coating is applied.

21. The method of manufacturing of an optical waveguide as in claim 18 wherein the orientation of the molecules or crystals is by a temperature gradient as the coating is applied.

22. The method of manufacturing of an optical waveguide as in claim 18 wherein the orientation of the molecules or crystals is by an electric field as the coating is applied.

23. The method of manufacturing an optical waveguide as in claims 18, 19, 20, 21 or 22 wherein the cladding has microgrooves for the preferential orientation of said coating.

24. The method of manufacturing of an optical waveguide as in claim 18 wherein said coating is coated on the cladding surface from a lyotropic liquid crystal or polymer.

25. An optical waveguide as in claims 1, 2 or 3 wherein the coating has a birefringence between 0.001 and 1.200.

* * * * *